US009330431B2

(12) United States Patent
Huang

(10) Patent No.: US 9,330,431 B2
(45) Date of Patent: May 3, 2016

(54) SYSTEM AND METHOD FOR SYNCHRONIZING, MERGING, AND UTILIZING MULTIPLE DATA SETS FOR AUGMENTED REALITY APPLICATION

(71) Applicant: Jeffrey Huang, San Jose, CA (US)

(72) Inventor: Jeffrey Huang, San Jose, CA (US)

( * ) Notice: Subject to any disclaimer, the term of this patent is extended or adjusted under 35 U.S.C. 154(b) by 257 days.

(21) Appl. No.: 13/720,994

(22) Filed: Dec. 19, 2012

(65) Prior Publication Data

US 2014/0168243 A1    Jun. 19, 2014

(51) Int. Cl.
 *G09G 5/00*    (2006.01)
 *G06T 1/20*    (2006.01)
 *H04N 21/472*  (2011.01)
 *G09G 5/377*   (2006.01)

(52) U.S. Cl.
 CPC  *G06T 1/20* (2013.01); *G09G 5/377* (2013.01); *G09G 2340/12* (2013.01); *G09G 2340/125* (2013.01); *G09G 2354/00* (2013.01); *H04N 21/472* (2013.01)

(58) Field of Classification Search
 CPC ............. G06T 19/006; G09G 2340/12; G09G 2340/125; G09G 2354/00; G09G 5/377; H04N 21/472
 USPC ........................................................ 345/633
 See application file for complete search history.

(56) References Cited

U.S. PATENT DOCUMENTS

| 6,414,696 | B1 * | 7/2002 | Ellenby et al. | 715/762 |
|---|---|---|---|---|
| 6,765,568 | B2 * | 7/2004 | Swift et al. | 345/419 |
| 7,116,342 | B2 * | 10/2006 | Dengler et al. | 345/630 |
| 8,031,208 | B2 * | 10/2011 | Teruyama et al. | 345/629 |
| 8,493,353 | B2 * | 7/2013 | Blanchflower et al. | 345/173 |
| 8,620,021 | B2 * | 12/2013 | Knudson et al. | 382/100 |
| 8,698,843 | B2 * | 4/2014 | Tseng | 345/633 |
| 2011/0164163 | A1 * | 7/2011 | Bilbrey et al. | 348/333.01 |
| 2012/0105473 | A1 * | 5/2012 | Bar-Zeev et al. | 345/633 |
| 2012/0105475 | A1 * | 5/2012 | Tseng | 345/633 |
| 2012/0154619 | A1 * | 6/2012 | Lee | 348/222.1 |
| 2012/0210254 | A1 * | 8/2012 | Fukuchi et al. | 715/757 |
| 2013/0072116 | A1 * | 3/2013 | Song et al. | 455/41.1 |

* cited by examiner

*Primary Examiner* — Barry Drennan
*Assistant Examiner* — Robert Craddock
(74) *Attorney, Agent, or Firm* — Invent Capture, LLC.; Samuel S. Cho

(57) ABSTRACT

Systems and methods for synchronizing, merging, and utilizing multiple data sets for augmented reality application are disclosed. In one example, an electronic system receives and processes live recorded video information, GPS information, map data information, and points of interest information to produce a data set comprising merged graphical and/or audio information and non-graphical and non-audio information metadata that are referenced to the same clock and timestamp information. This data set can be stored in a cloud network storage. By retaining numerical and textual values of non-graphical and non-audio information (e.g. camera viewing angle information, GPS coordinates, accelerometer values, and compass coordinates) as metadata that are referenced to the same clock and timestamp information within the data set, an augmented reality application that replays information or augments information in real time can dynamically select or change how the data set is presented in augmented reality based on dynamically-changeable user preferences.

17 Claims, 7 Drawing Sheets

Location Search-Based Augmented Reality

700

SYSTEM AND METHOD FOR SYNCHRONIZING, MERGING, AND UTILIZING MULTIPLE DATA SETS FOR AUGMENTED REALITY APPLICATION

BACKGROUND OF THE INVENTION

The present invention generally relates to capturing, processing, and using a plurality of multimedia data sets for electronic systems. More specifically, the invention relates to one or more systems and methods for synchronizing, merging, and utilizing multiple data sets for augmented reality applications. Furthermore, the invention also relates to identifying, time-synchronizing, and creating a merged graphical and/or audio information data set and a non-graphical and non-audio information metadata from a plurality of data sets for subsequent use in augmented reality applications. In addition, the invention also relates to replaying or creating an augmented reality environment capable of dynamically-selecting and dynamically-changing information associated with a particular file or a particular geographical location.

Visual monitoring systems, such as closed-circuit televisions (CCTV's) for buildings and strategic locations and vehicle black boxes, are widely used in today's consumer and business electronics market. Many of these visual monitoring systems are able to capture, process, and record visual information as well as aural information in a digitized format in a local storage or a network-attached storage. In some instances, different types of visual information from multiple cameras or multiple data sources are juxtaposed and presented via a user interface in a single display screen. Furthermore, the user interface is also typically able to select one particular aural information associated with a particular visual information among a plurality of visual information via speakers in the single display screen.

In conventional visual monitoring systems, different types of visual information are kept as separate file formats in a data capture mode or a recording mode. For example, a live recorded video through a front windshield of a vehicle is in an independent multimedia data format, such as MPEG2, MPEG4, and WMV. If there is another live recorded video (e.g. through a rear windshield, a vehicle's cabin, and etc.) associated with a conventional visual monitoring system, then even if the two videos are displayed via a same user interface on a single display screen, the two video files typically remain separate and independent from each other. The separation of data formats among multiple visual, audio, and/or sensory information sources is even more likely if a type of visual, audio, and/or sensory information source is fundamentally different (e.g. camera feed vs. GPS map information), because the file format types themselves may be entirely different.

In some instances, augmented reality applications that require multiple visual, audio, and/or sensory information sources may encounter technical and logistical challenges in recreating an augmented reality environment in a single user interface in near real-time, especially if wireless transmission methods are used, because the multiple visual, audio, and/or sensory information sources in separate and different data formats have to be transmitted, received, and then synchronized to ensure that the referenced time stamps in the separate and different data formats are properly corresponding to a same time reference frame. Even though conventional data buffering methods may alleviate some technical difficulties in accommodating the augmented reality environment that receives, processes, and synchronizes multiple visual, audio, and/or sensory information sources from remote locations, multiple visual, audio, and/or sensory information sources in separate and/or different data formats are more likely to suffer data streaming glitches due to data network congestions than a single data format in most augmented reality applications. Data download synchronization challenges may be significant for an augmented reality application, if multiple visual, audio, and/or sensory information sources in separate and/or different data formats are to be received by the augmented reality application at a remote location and then displayed on a display screen simultaneously.

Furthermore, if a user desires to recreate an augmented reality environment based on a multiple number of previously-recorded visual, audio, and/or sensory information sources by downloading a plurality of separate and different data files in multiple formats, a user interface and an associated augmented reality application may also encounter time synchronization and technical difficulties in displaying the multiple number of previously-recorded visual, audio, and/or sensory information simultaneously, because the referenced time stamps in each data format may not be correctly synchronized for the user interface and the associated augmented reality application.

For example, if an augmented reality application is designed to display a frontal view, a driver's side view, and a rear view of a user's vehicle, while also displaying GPS map data and a second-by-second location of the vehicle, conventional visual monitoring systems for augmented reality require three separate video files for three different angles of the vehicle, a map data-related file, and a GPS location log for the vehicle which can be superimposed on the map data-related file in a display screen. Recreating an augmented reality environment by streaming multiple sources of data files in a data transmission network (e.g. wired, wireless, and/or cellular networks) presents significant technical difficulties for the augmented reality application that receives and attempts to time-synchronize the multiple sources of data files for a simultaneous display of multiple visual information.

In addition, in some augmented reality applications, it may be advantageous to enable a user to make dynamic changes and selections in a replay video or in a real-time augmented reality environment for a particular geographic location, so that the user can dynamically change or select different viewing angles and different information from previously-recorded visual, audio, and/or sensory information for presentation in the replay video or in the real-time augmented reality environment for the particular geographic location.

Therefore, it may be desirable to devise a system and a method that can efficiently process and readily synchronize a plurality of visual information data in augmented reality applications. Furthermore, it may also be desirable to devise a system and a method which are configured to merge a plurality of visual information data while retaining a non-graphical and non-audio portion of information associated with the plurality of visual information data as separate metadata variables from graphical information. In addition, it may also be desirable to provide an augmented reality application with a capability to enable a user-triggered dynamic change or dynamic selection from previously-recorded visual, audio, and/or sensory information in a replay video or in a real-time augmented reality environment by retaining a non-graphical and non-audio portion of information as separate variables from graphical information.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, an electronic system for synchronizing and merging multiple data sets for an augmented reality application is disclosed. This electronic system comprises: a CPU and a memory unit configured to execute the augmented reality application, wherein the augmented reality application provides a user interface on a display screen for display of video and other information associated with a real-world environment: a first data set comprising live recorded video and/or audio information referenced to clock and timestamp information, wherein the first data set is loaded to the memory unit of the electronic system; a second data set comprising GPS information, map data information, and points of interest information, wherein the second data set is also loaded to the memory unit of the electronic system; a third data set comprising merged graphical and/or audio information and non-graphical and non-audio information metadata, wherein the merged graphical and/or audio information and the non-graphical and non-audio information metadata are created from the first data set and the second data set using the augmented reality application executed on the CPU, and wherein the merged graphical and/or audio information and the non-graphical and non-audio information metadata of the third data set are both referenced to the clock and timestamp information of the first data set to enable correct time synchronization of the merged graphical and/or audio information and the non-graphical and non-audio information metadata during a full or selective replay; and an external communication input and output interface configured to transmit the third data set as one or more data packets to another electronic system via a data network.

In another embodiment of the invention, a method for synchronizing, merging, and utilizing multiple data sets for an augmented reality application executed on a CPU and a memory unit of an electronic system is disclosed. This method comprises: displaying a live video footage via a user display panel while the live footage is being recorded into a local and/or a network-attached storage; displaying map graphics and underlying non-graphical and non-audio data including GPS coordinates, points of interest, and/or current timestamps; and if the augmented reality application is configured to merge the live video footage with the map graphics and the underlying non-graphical and non-audio data: creating a merged graphical and/or audio information data set comprising the live video footage and the map graphics; creating a metadata set for non-graphical and non-audio information which includes the underlying non-graphical and non-audio data, wherein the metadata set is time-synchronized with the merged graphical and/or audio information data set by referencing to same timestamps; and storing the merged graphical and/or audio information data set and the metadata set for non-graphical and non-audio information as separate files or as a combined file in a local and/or a cloud network storage.

Yet in another embodiment of the invention, a method for providing a geographic location search-based augmented reality application executed on a CPU and a memory unit of an electronic system is disclosed. This method comprises: loading the geographic location search-based augmented reality application on the CPU and the memory of the electronic system, wherein the electronic system is an electronic goggle with an embedded display and an eye-movement tracking sensor for location-pointing, another wearable computer, or another electronic device, which is configured to retrieve previously-stored information associated with a particular geographic location; selecting or pointing to the particular geographic location using the electronic system during an operation of the geographic location search-based augmented reality application; checking whether a video file is associated with the particular geographic location in a cloud network storage or a local storage operatively connected to the electronic system; and if the video file is found, checking whether the video file includes metadata for non-graphical and non-audio information: if the metadata for non-graphical and non-audio information is included in the video file, extracting the metadata for the geographic location search-based augmented reality application using a user's general and/or specific preferences, and displaying dynamically-changeable geographic location-associated graphical information and non-graphical and non-audio information; else if the metadata for non-graphical and non-audio information is not included in the video file, replaying the video file which does not have separate metadata for non-graphical and non-audio information.

DETAILED DESCRIPTION

Figure 1:
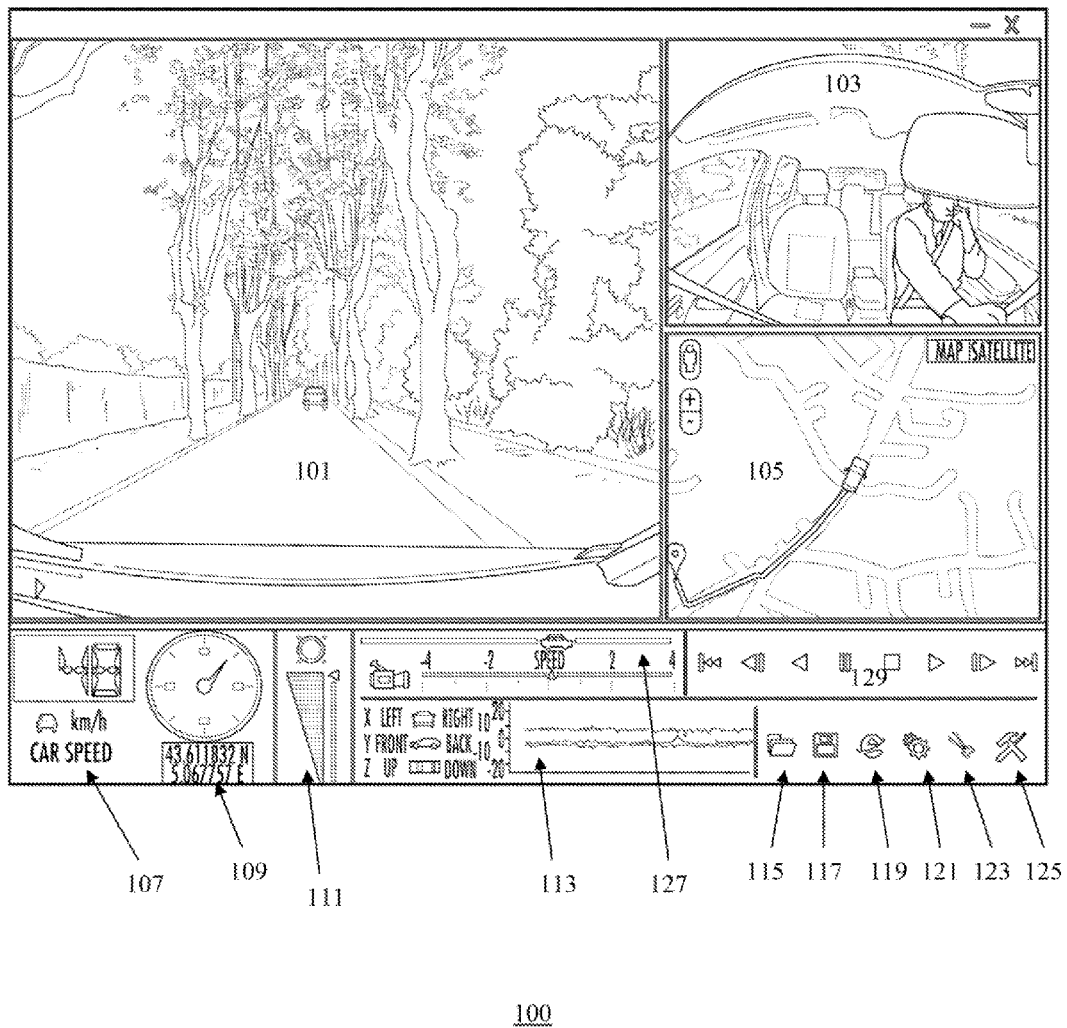
FIG. 1 shows an example of an augmented reality application displayed on a display screen, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of procedures, logic blocks, processing, and/or other symbolic representations that directly or indirectly resemble a system and a method for synchronizing, merging, and utilizing multiple data sets for augmented reality applications. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "augmented reality" is defined as a live or recorded representation of a real-world environment using one or more cameras, sensors, microphones, and/or other equipment to represent visual, auditory, and/or sensory information associated with the real-world environment. For example, an augmented reality application executed on a CPU and a memory unit of a computer system may receive multiple video feeds from cameras at different positions or angles, GPS sensor or other sensory data feeds from multiple locations, and audio feeds from multiple microphones to represent many of these visual, auditory, and sensory information in a single user interface, such as a display screen or a touch-sensitive screen. Furthermore, an augmented reality application may involve the real-world environment geographically close to or remote from an electronic system that executes the augmented reality application.

Furthermore, for the purpose of describing the invention, a term "visual monitoring system" is defined as an electronic system such as a CCTV, a standalone camera, an integrated camera in another electronic system, a vehicle black box, or another device capable of displaying and/or recording live visual, auditory, and/or sensory information in a local storage or a network-attached storage. In one example, the visual monitoring system may be able to display the live visual, auditory, and/or sensory information in a user interface of an electronic system, which is remotely connected to the visual monitoring system via a wireless data network and/or a wired data network. In another example, the visual monitoring system may be able to store at least some information in its local storage integrated inside the visual monitoring system, while transmitting at least some information to a remotely-located device operatively connected to the visual monitoring system via a wireless and/or wired data network.

In addition, for the purpose of describing the invention, a term "cloud," "cloud network," or "cloud computing" is defined as a data network environment in which data from an electronic system operatively connected to the data network environment is typically stored in a network-attached storage, instead of a local storage of the electronic system. In one example, the data from the electronic system may be stored in both the local storage of the electronic system as well as the network-attached storage by default. In another example, the data from the electronic system may only be stored in the network-attached storage by default without storing any data permanently in the local storage of the electronic system, other than utilizing a temporary local buffer of the electronic system.

Moreover, for the purpose of describing the invention, a term "electronic system" is defined as an electronic-circuit hardware device such as a computer system, a computer server, a handheld device (e.g. a cellular phone, a camera, a camcorder, and etc.), a visual monitoring system, or another electronic-circuit hardware device.

Furthermore, for the purpose of describing the invention, a term "location search-based augmented reality application" is defined as a software program or an embedded software that provides geographic location-associated information in an augmented reality environment when a user selects, points to, and/or searches for a particular geographic location. For example, if the user is wearing an electronic goggle with an embedded display and an eye-movement tracking sensor while strolling in downtown, the user's eyes may point to a particular building, after which the location search-based augmented reality application displays location-associated information, such as a previously-recorded visual, audio, and/or sensory information near the particular building, interesting factoids associated with the particular building, and today's menu specials at a first-floor restaurant in the particular building. In one embodiment of the invention, the location search-based augmented reality application can be executed on a CPU (e.g. a microprocessor, an application processor, a microcontroller, and etc.) and a memory unit of any electronic devices, including an electronic goggle, a smart phone, a tablet computer, a notebook computer, a visual monitoring system, or another electronic device.

In general, one or more embodiments of the invention relate to data processing and synthesis for operating an augmented reality environment using a computer system or another electronic system. More specifically, one or more embodiments of the invention relate to providing a coherent and time-synchronized data set from a multiple number of data sets from a plurality of visual, audio, and/or sensory information sources for efficient and reliable operation of an augmented reality environment executed on a computer system or another electronic system. Furthermore, some embodiments of the invention relate to identifying, merging, grouping, and/or synthesizing graphical and/or audio information data sets and metadata comprising non-graphical and non-audio portions of information from a plurality of visual, audio, and/or sensory information sources.

In addition, one or more embodiments of the invention relate to utilizing multiple data sets that incorporate non-graphical and non-audio metadata in an augmented reality application, wherein the non-graphical and non-audio metadata enable user-triggered dynamic changes and dynamic selections in a replay video or in a geographic location search-based augmented reality environment. For example, different camera scene information, viewing angle information, compass readings, GPS coordinates, accelerometer readings, text information, and etc. can be stored as alphanumeric values (i.e. assigned to corresponding variables), which can be dynamically changed or selected for utilization in an augmented reality application, even as previously-recorded graphical information is separately displayed within the augmented reality application.

An objective of an embodiment of the present invention is to identify and group graphical and/or audio information data sets from a plurality of visual, audio, and/or sensory information sources, while also identifying, grouping, and synthesizing non-graphical and non-audio portions of information from the plurality of visual, audio, and/or sensory information sources as metadata which can be used to time-synchronize the graphical and/or audio information data sets and to provide a dynamically-changeable augmented reality environment during replay.

Furthermore, another objective of an embodiment of the present invention is to store identified, grouped, and/or synthesized graphical and non-graphical and non-audio portions of information from a plurality of visual, audio, and/or sensory information sources in a network-attached storage in a cloud network or in a local storage of an electronic system.

Yet another objective of an embodiment of the invention is to provide a system and a method for synchronizing and merging multiple data sets for augmented reality applications involving GPS information and video data.

In addition, another objective of an embodiment of the present invention is to transmit identified, grouped, and/or synthesized graphical and non-graphical and non-audio portions of information from a plurality of visual, audio, and/or sensory information sources to an electronic system that executes an augmented reality application to recreate or simulate a real-world environment using the graphical and non-graphical and non-audio portions of information.

Yet another objective of an embodiment of the invention is to provide an augmented reality application that utilizes multiple data sets incorporating non-graphical and non-audio metadata to enable user-triggered dynamic changes and dynamic selections in a replay video or in a geographic location search-based augmented reality environment.

FIG. 1 shows an example of an augmented reality application (100) displayed on a display screen, in accordance with an embodiment of the invention. In a preferred embodiment of the invention, the augmented reality application (100) is executed on a CPU and a memory unit of an electronic system, such as a computer system or a portable device with a display screen. In the particular example as shown in FIG. 1, the augmented reality application (100) is executed on a CPU and a memory unit of a vehicle black box system, which is configured to display and record visual, auditory, and/or sensory information associated with a vehicle. In the preferred embodiment of the invention, the augmented reality application (100) for the vehicle black box system is capable of wirelessly transmitting visual, auditory, and/or sensory information to a network-attached storage in a cloud network.

As shown in FIG. 1, in this embodiment of the invention, the augmented reality application (100) operating in the vehicle black box system displays a front windshield view (101) from a front windshield camera, a vehicle cabin view (103) from a cabin camera, and a GPS and map view (105) associated with GPS coordinates and underlying map data in a large portion of the display screen. Furthermore, the augmented reality application (100) also includes sensory information such as a speedometer (107), compass coordinates (109), and an accelerometer reading (113). In a preferred embodiment of the invention, the speedometer (107) may derive its speed information based on changes of GPS coordinates relative to time that are derived from the GPS receiver chipset, instead of embedding a separate speedometer sensor in the vehicle black box system. Likewise, the compass coordinates (109) may also be derived from the GPS coordinates from the GPS receiver chipset, instead of embedding a separate compass in the vehicle black box system. In another embodiment of the invention, the speedometer (107) and/or the compass coordinates (109) may utilize one or more separate sensors other than GPS coordinates derived from a GPS chipset in the vehicle black box.

Furthermore, in the embodiment of the invention as shown in FIG. 1, a three-axis accelerometer sensor may be associated with or embedded in the vehicle black box system to generate three-axis (i.e. X, Y, Z) accelerometer readings for the vehicle, as displayed by the accelerometer reading display (113). In a preferred embodiment of the invention, the three-axis accelerometer sensor is a micro electromechanical system (MEMS) device that measures the vehicle's "g-force" or acceleration in various directions during driving. In one embodiment of the invention, the augmented reality application (100) can display and record various sensor-based readings, such as speed, compass coordinates, and accelerometer values, in addition to the visual and/or the auditory recordings associated with the front windshield view (101) and the vehicle cabin view (103). Furthermore, GPS coordinates for a current location of the vehicle can be displayed in association with an underlying map data, as shown in the GPS and map view using the augmented reality application.

Continuing with FIG. 1, in the preferred embodiment of the invention, various visual, auditory, and sensory information (e.g. 101, 103, 105, 107, 109, and 113) displayed on the display screen can be merged and synthesized as a single file and recorded to a local storage or a cloud network storage, which is operatively connected to the vehicle black box system via a wireless data network. In the preferred embodiment of the invention, graphical and/or audio information data sets from camera viewing angles (101, 103), the GPS and map view (105), and any audio data can be intelligently merged together as a single data set (e.g. 317 of FIG. 3), while metadata comprising non-graphical and non-audio portions of information (e.g. 319 of FIG. 3), such as sensor readings, GPS coordinates relative to time stamps, camera viewing angle information (e.g. front, rear, side, vehicle cabin, a primary camera angle, a secondary camera angle, and etc.), and GPS and map view preferences information (e.g. zoom-in/zoom-out view, street view, satellite view, and etc.), can be also intelligently merged together as a single metadata set. Furthermore, in the preferred embodiment of the invention, the merged graphical and/or audio information data set (317) and the metadata set (319) comprise a single coherent file that stores all information captured by an electronic system (e.g. the vehicle black box system of FIG. 1), which executes the augmented reality application (100).

As shown by FIG. 1, in one embodiment of the invention, the augmented reality application (100) can display an audio speaker volume control (111), and also replay the stored information (e.g. 315, 317, 319 of FIG. 3) using a playback interface (129) and a playback speed control (127). In the particular example as shown in FIG. 1, an "open folder" button (115), a "save file" button (117), "a web browser access" button (119), a "settings control" button (121), an "information cut" button (123), and a "close application" button (125) are also provided by the augmented reality application (100) to access, store, and control the recorded information via the vehicle black box system.

Although FIG. 1 and its related user interface features show one particular embodiment of the invention that utilizes a vehicle black box system as an example of an electronic device operating an augmented reality application, other electronic devices, such as an electronic goggle with an embedded display and an eye-movement tracking sensor for location-pointing, another type of wearable computer, a smart phone, a tablet device, a notebook computer, and/or any other suitable electronic devices can operate an augmented reality application to incorporate one or more embodiments of the present invention that merges, synchronizes, and utilizes multiple data sets, as shown in FIGS. 1~7.

Unlike what is presented and described in association with FIG. 1, in conventional augmented reality applications, various visual, auditory, and sensory information (e.g. 101, 103, 105, 107, 109, and 113) are typically saved as separate files without intelligent merger or synthesis of multiple data sets during a data-recording procedure. For example, in one example of a conventional vehicle black box system, visual information captured via the front windshield view (101), the vehicle cabin view (103), the GPS and map view (105), and any sensor information (107, 109, 113) are recorded in their separate native formats. This presents time synchronization challenges and data transmission reliability problems, if an augmented reality environment needs to be recreated at a geographic location far away from the data sources in a cloud network. Furthermore, in another example of a conventional vehicle black box system, visual information and any map and sensory information displayed on a display screen are captured as a "flattened" file, which is merely a series of full screen captures without retaining any alphanumeric variables and their values associated with the map and sensory information. An augmented reality application utilizing such a conventional flattened file as a replay or as part of a geographic location-search augmented reality environment is unable to dynamically change or select any non-graphical and non-audio information, which is merely embedded as "screen-captured" display information within the flattened file. In contrast, various embodiments of the present invention uniquely enable retention of alphanumeric variables and their values for map data, GPS, sensory, and other non-graphical and non-audio information as metadata that can be processed as live variables and values in an augmented reality application, thereby providing a novel advantage of selective and dynamic information presentation in an augmented reality environment that replays or utilizes previously-recorded visual, audio, and/or sensory information.

Figure 2:
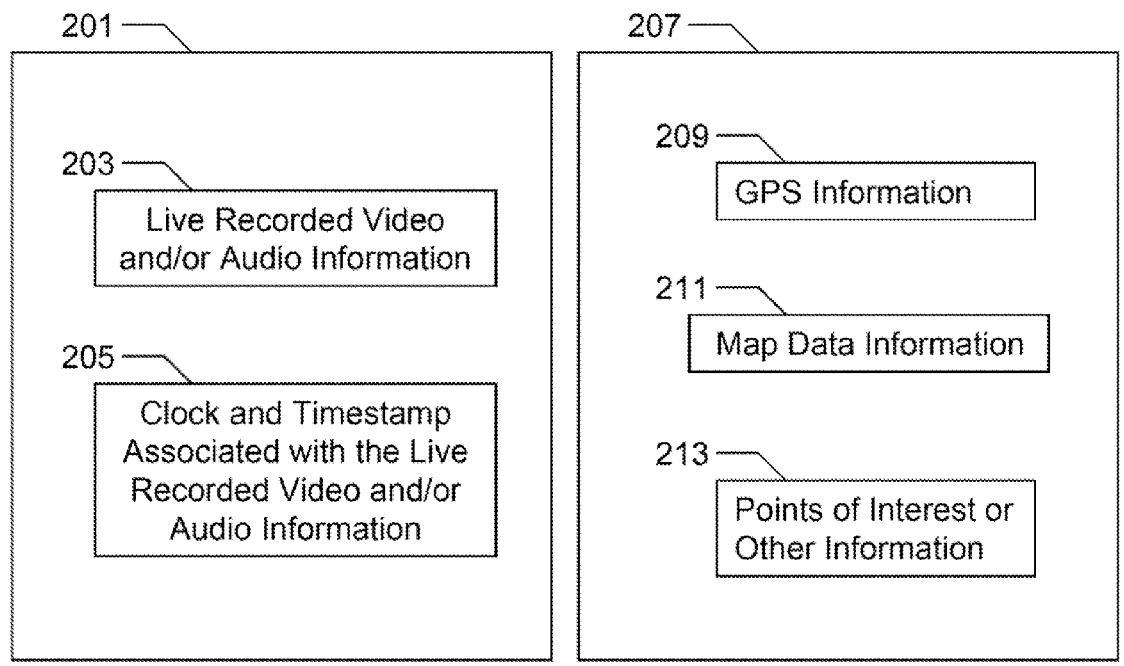
FIG. 2 shows a plurality of data structures representing multiple visual, audio, and/or sensory information sources, in accordance with an embodiment of the invention.

FIG. 2 shows a plurality of data structures (200) representing multiple visual, audio, and/or sensory information sources, in accordance with an embodiment of the invention. In a preferred embodiment of the invention, the plurality of data structures comprise a first data set (201) and a second data set (207). In this embodiment of the invention, the first data set (201) comprises live recorded video and/or audio information (203) from a multimedia information recording device, which is referenced to clock and timestamp information (205). Furthermore, the second data set (207) comprises GPS information (209), map data information (211), and points of interest information or other information (213), which may also come from a multimedia information recording device with a GPS receiver or another electronic system with GPS navigation capability. In some embodiments of the invention, there may be a plurality of data sets which may resemble one or more first data sets (201) and second data sets (207).

In the preferred embodiment of the invention, the live recorded video and/or audio information (203) includes live video and/or audio data from a visual monitoring system, a camcorder, or another real-time multimedia information recording device. In one embodiment of the invention, the live recorded video and/or audio information (203) may be in an MPEG format, a WMV format, or another video-recording standard format. In some embodiments of the invention, there may be a multiple number of live recorded video and/or audio information from a plurality of real-time multimedia information recording devices. In the preferred embodiment of the invention, one or more live recorded video and/or audio information (203) are referenced to one or more clock and timestamps (205) associated with corresponding live recorded video and/or audio information (203). In another embodiment of the invention, a plurality of live recorded video and/or audio information (203) may be referenced to one particular clock and timestamp (205) for time-synchronization and simultaneous replay among the plurality of live recorded video and/or audio information (203).

Continuing with FIG. 2, in the preferred embodiment of the invention, the GPS information (209) in the second data set (207) includes GPS coordinates and/or other GPS-related information for one or more real-time multimedia information recording devices, wherein the GPS coordinates are referenced to clock and timestamp information. Preferably, the clock and timestamp information of the GPS information (209) in the second data set (207) is either identical or correlated to the clock and timestamp information (205) of the first data set (201). Furthermore, in the preferred embodiment of the invention, the map data information (211) includes both graphical map data (e.g. for displayable maps) and non-graphical map data (e.g. alphanumeric texts, street names, landmark names, and other non-graphical information), which are typically superimposed onto the graphical map data while displaying map graphics. In addition, in the preferred embodiment of the invention, the points of interest or other information (213) associated with the GPS information (209) and the map data information (211) is also stored as part of the second data set (207). Examples of points of interest information include, but are not limited to, nearby tourist attractions, gas stations, airports, and other location addresses that may be beneficial to a user of a GPS-based navigation software operating in an electronic system (e.g. a vehicle black box system, a smart phone, a camcorder, a dedicated navigation device, an electronic goggle with an embedded display, and etc.).

Figure 3:
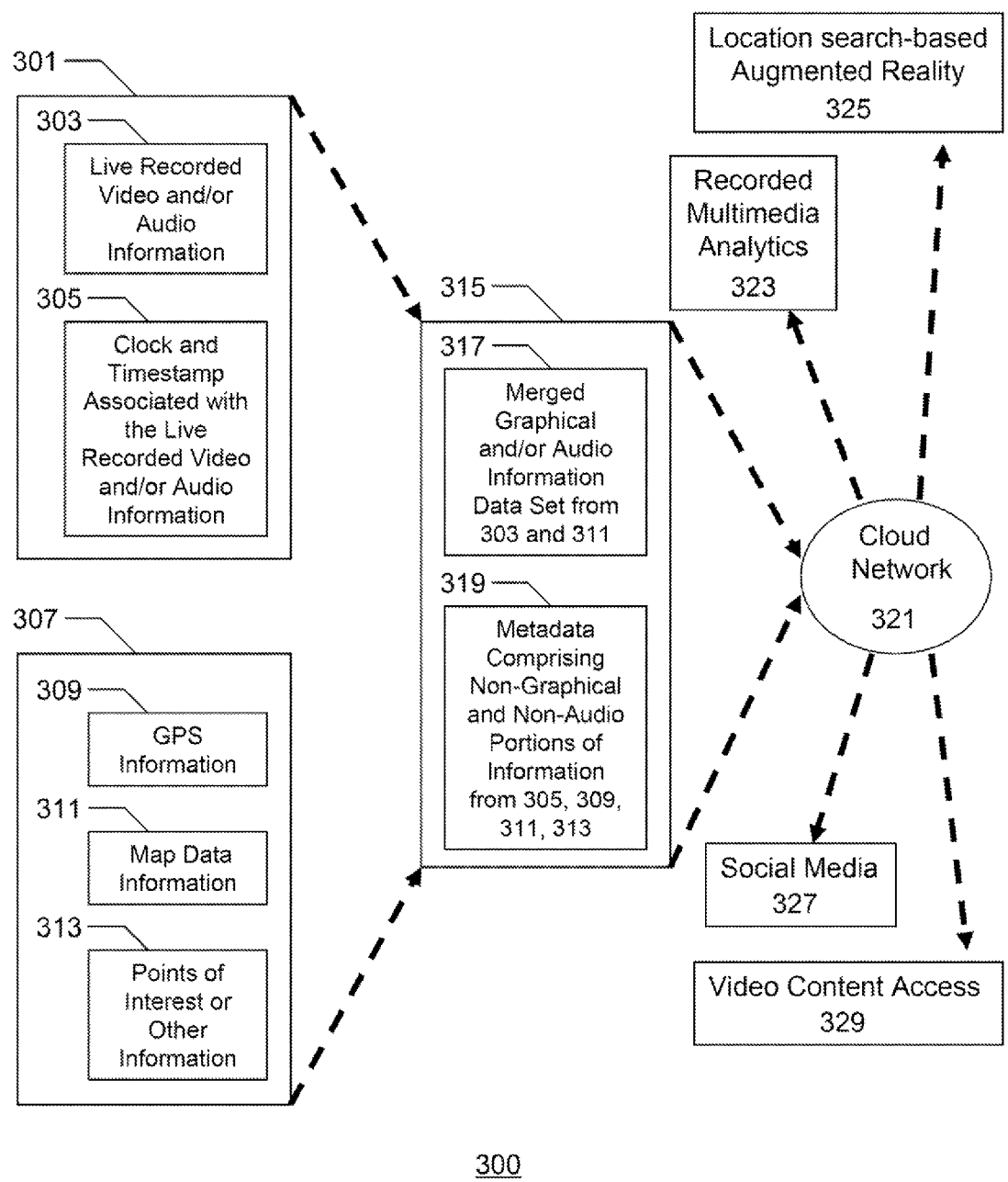
FIG. 3 shows a merger of a graphical and/or audio information data set and a synthesis of metadata comprising non-graphical and non-audio portions of information from a plurality of visual, audio, and/or sensory information sources, in accordance with an embodiment of the invention.

FIG. 3 shows a data flow diagram (300), which in part illustrates a merger of a graphical and/or audio information data set (317) and a synthesis of metadata comprising non-graphical and non-audio portions of information (319) from a plurality of visual, audio, and/or sensory information sources, in accordance with an embodiment of the invention. In a preferred embodiment of the invention, a first data set (301) and a second data set (307) are provided by one or more multimedia information recording devices. In the embodiment of the invention shown in FIG. 3, the first data set (301) comprises live recorded video and/or audio information (303) from a multimedia information recording device, which is referenced to clock and timestamp information (305). Furthermore, the second data set (307) comprises GPS information (309), map data information (311), and points of interest information or other information (313), which may also come from a multimedia information recording device with a GPS receiver or another electronic system with GPS navigation capability. In some embodiments of the invention, there may be a plurality of data sets which may resemble one or more first data sets (301) and second data sets (307).

Furthermore, in the preferred embodiment of the invention, the live recorded video and/or audio information (303) includes live video and/or audio data from a visual monitoring system, a camcorder, or another real-time multimedia information recording device. The live recorded video and/or audio information (303) may be in an MPEG format, a WMV format, or another video-recording standard format. In some embodiments of the invention, there may be a multiple number of live recorded video and/or audio information from a plurality of real-time multimedia information recording devices. In the preferred embodiment of the invention, one or more live recorded video and/or audio information (303) are referenced to one or more clock and timestamps (305) associated with corresponding live recorded video and/or audio information (303). In another embodiment of the invention, a plurality of live recorded video and/or audio information (303) may be referenced to one particular clock and timestamp (305) for time-synchronization and simultaneous replay among the plurality of live recorded video and/or audio information (303).

Continuing with FIG. 3, in the preferred embodiment of the invention, the GPS information (309) in the second data set (307) includes GPS coordinates and/or other GPS-related information for one or more real-time multimedia information recording devices, wherein the GPS coordinates are referenced to clock and timestamp information. Preferably, the clock and timestamp information of the GPS information (309) in the second data set (307) is either identical or correlated to the clock and timestamp information (305) of the first data set (301). Furthermore, in the preferred embodiment of the invention, the map data information (311) includes both graphical map data (e.g. for displayable maps) and non-graphical map data (e.g. alphanumeric texts, street names, landmark names, and other non-graphical information), which are typically superimposed onto the graphical map data while displaying map graphics. In addition, in the preferred embodiment of the invention, the points of interest or other information (313) associated with the GPS information (309) and the map data information (311) is also stored as part of the second data set (307). Examples of points of interest information include, but are not limited to, nearby tourist attractions, gas stations, airports, and other location addresses that may be beneficial to a user of a GPS-based navigation software operating in an electronic system (e.g. a vehicle black box system, a smart phone, a camcorder, a dedicated navigation device, an electronic goggle with an embedded display, and etc.).

As shown in the data flow diagram (300) of FIG. 3, the first data set (301) and the second data set (307) are then processed by a multimedia information recording device or another electronic system to create a merged graphical and/or audio information data set (317) from one or more live recorded video and/or audio information (303) and graphical data from the map data information (311). The first data set (301) and the second data set (307) are also further processed to create non-graphical and non-audio information metadata (319), typically from the clock and timestamp information (305), the GPS information (309), non-graphical portions of the map data information (311), and the points of interest or other information (313).

In a preferred embodiment of the invention, the merged graphical and/or audio information data set (317) and the non-graphical and non-audio information metadata (319) are then combined as a third data set (315), which may be contained in a single file. The merged graphical and/or audio information data set (317) and the non-graphical and non-audio information metadata (319) are typically both referenced to the clock and timestamp information (305) of the first data set (301) to enable correct time synchronization of the merged graphical and/or audio information data set (317) and the non-graphical and non-audio information metadata (319) during a full or selective replay by an augmented reality application.

In another embodiment of the invention, the merged graphical and/or audio information data set (317) and the non-graphical and non-audio information metadata (319) may be generated as separate files, yet still comprise the third data set (315) which references to the clock and timestamp information (305) of the first data set (301) to enable correct time synchronization of the merged graphical and/or audio information data set (317) and the non-graphical and non-audio information metadata (319) during a full or selective replay by an augmented reality application.

Continuing with FIG. 3, in a preferred embodiment of the invention, once the third data set (315) is fully created by a multimedia information recording device or another electronic system, the third data set (315) can be packetized and transmitted to a cloud computing network (321) via wireless, wired, and/or cellular data transmission methods. In the preferred embodiment of the invention, the cloud computing network (321) includes a computer server which can receive data packets representing the third data set (315) and then store the completely-transmitted third data set (315) in a data storage device, such as a hard disk or a flash memory unit operatively connected to the computer server.

Furthermore, in the preferred embodiment of the invention, various types of electronic systems, devices, and services can retrieve the third data set (315) for replay or for providing augmented information in an augmented reality application. For example, a recorded multimedia analytics system (323) or a related website can provide a user interface that can edit, decode, and interpret a variety of information embedded in the third data set (315). The recorded multimedia analytics system (323) or a related website may be capable of analyzing or editing the merged graphical and/or audio information data set (317) and the non-graphical and non-audio information metadata (319).

In another example, a geographic location search-based augmented reality application (325) executed on a CPU and a memory unit of an electronic system (e.g. an electronic goggle with an embedded display and an eye-movement tracking sensor for location pointing, another wearable computer, a smart phone, and etc.) can retrieve the third data set (315) via wireless, wired, and/or cellular data transmission methods, and then extract the non-graphical and non-audio information metadata (319) to generate dynamically-changeable geographic location-associated information for the location search-based augmented reality application (325). Preferably, the location search-based augmented reality application (325) is capable of taking user preferences into account for selective generation of augmented information in a display unit. In one example, a user interested in historical background of downtown architecture may be able to see architectural background information of a particular building when his eye movements point to the particular building while wearing an electronic goggle with an embedded display. In this example, a related video describing the history of construction, architectural inspiration, and other interesting factoids that were previously recorded and stored in the cloud computing network (321) as a type of the third data set (315) may also be displayed in the electronic goggle. It should be noted that the unique retention of non-graphical and non-audio portions of the previously-recorded visual, audio, and/or sensory information as live variables and alphanumeric values in various embodiments of the present invention enables dynamic selections and dynamic changes in the location search-based augmented reality environment, because conventional "flattened" video files which are merely a series of screen captures do not retain live variables and values for the non-graphical and non-audio portions of the previously-recorded visual, audio, and/or sensory information. For example, if clock and timestamp information, camera viewing angle information, GPS coordinates, accelerometer values, and compass coordinates were previously recorded along with some graphical information (e.g. a live recorded video, GPS-guided maps, and etc.), an embodiment of the present invention maintains alphanumeric values assigned to each variable (e.g. clock and timestamp information, camera viewing angle information, GPS coordinates, accelerometer values, and compass coordinates) as metadata, instead of merely "flattening" such information into a series of screen captures in a graphics video file.

Yet in another example, a social media website (327) operatively connected to the cloud computing network (321) can access the third data set (315), and utilize the merged graphical and/or audio information data set (317) and the non-graphical and non-audio information metadata (319) for selective display or presentation in the social media website (327) based on user preferences. Similarly, in another example, a video content access service (329) and its associated website can be operatively connected to the cloud computing network (321) to access the third data set (315), and utilize the merged graphical and/or audio information data set (317) and the non-graphical and non-audio information metadata (319) for selective display or presentation in the video content access service (329) based on user preferences.

Figure 4:
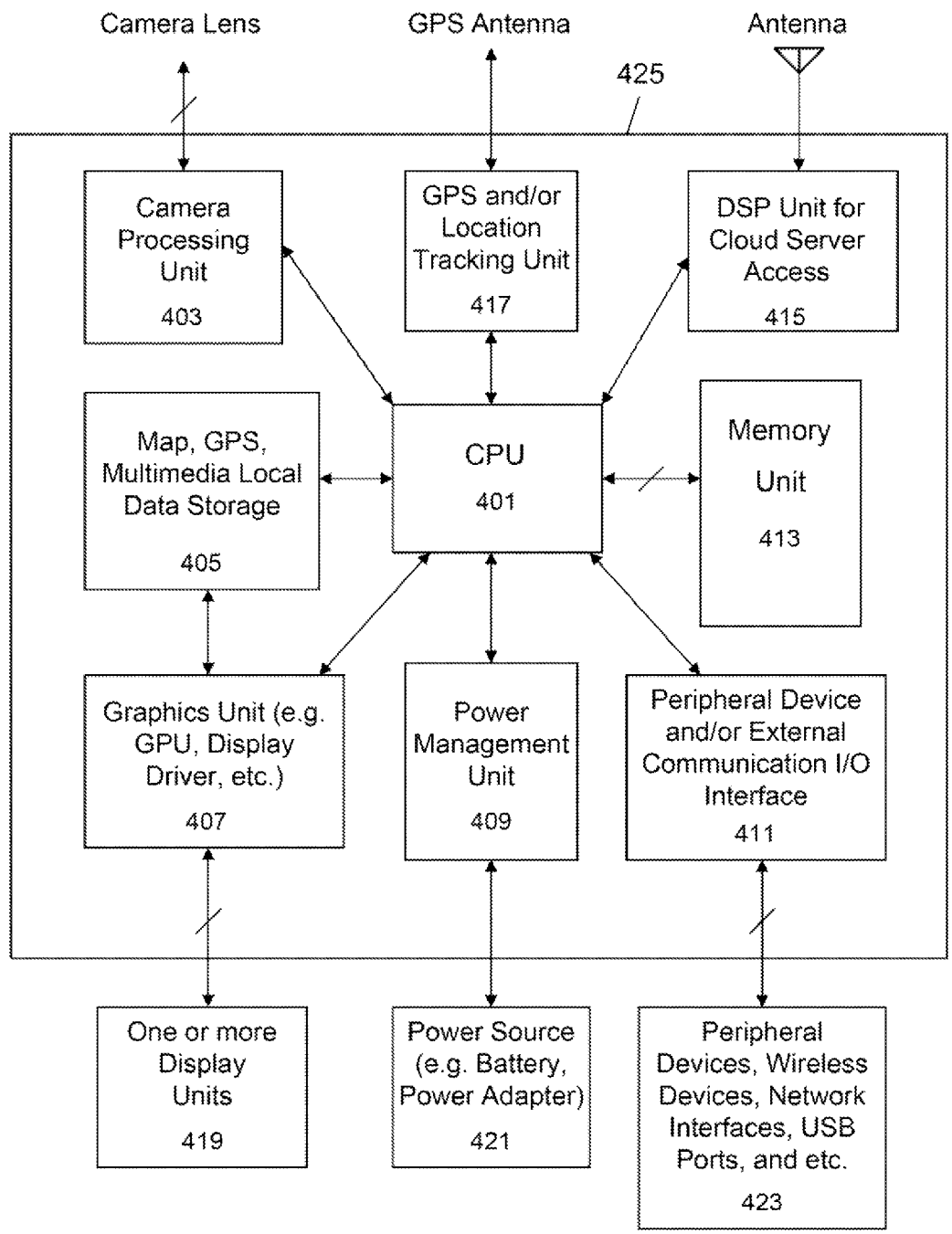
FIG. 4 shows a system block diagram for synchronizing and merging multiple data sets for an augmented reality application, in accordance with an embodiment of the invention.

FIG. 4 shows a system block diagram (400) for synchronizing and merging multiple data sets for an augmented reality application, in accordance with an embodiment of the invention. Multiple data set processing, synchronization, and merging may be handled by a multimedia information recording device (e.g. a visual monitoring system, a camcorder, a smart phone, an electronic goggle, and etc.), a computer server, or another suitable electronic system that operates the augmented reality application and/or other data transformation software.

In a preferred embodiment of the invention, an electronic system, which is configured to process, synchronize, and merge the multiple data sets for the augmented reality application, has a CPU (401) which is operatively connected to a memory unit (413), a map, GPS, and multimedia local data storage (405), a camera processing unit (403), a graphics unit (407) (e.g. a graphics processor, a display driver, and etc.), a power management unit (409), a peripheral device and/or external communication I/O interface (411), a digital signal processing (DSP) unit for cloud server access (415), a GPS and/or location tracking unit (417), and a sound unit. These logical units may be placed on a single printed circuit board (425) in one embodiment of the invention, or a plurality of printed circuit boards in another embodiment of the invention.

In the preferred embodiment of the invention, the CPU (401) is configured to control each logical unit operatively (i.e. directly or indirectly) connected to the CPU (401). The memory unit (413) typically comprises volatile memory banks based on DRAM's. In some embodiments of the invention, the memory unit (413) may use non-volatile memory technologies such as SRAM's and/or Flash memory. The memory unit (413) is capable of storing programs and applications which can be executed by the CPU (401), the graphics unit (407), or another logical unit operatively connected to the memory unit (413). In particular, in the preferred embodiment of the invention, an augmented reality software program and/or other software executed on the CPU (401) and the memory unit (413) of the electronic system merges and synchronizes a first data set that includes live recorded video and/or audio information and a second data set that includes GPS information, map data information, and points of interest information to produce an efficient and useful format for a subsequent use in augmented reality applications. Preferably, the merged and time-synchronized data set (i.e. a "third" data set) from the first data set and the second data set comprises merged graphical and/or audio information (e.g. 317 of FIG. 3) and non-graphical and non-audio information metadata (e.g. 319 of FIG. 3).

Any software and programs executed on the CPU (401) and the memory unit (413) of the electronic system may be part of an operating system, or a separate application installed on the operating system of the electronic system. Furthermore, in one embodiment of the invention, the map, GPS, and multimedia local data storage (405) is configured to store GPS information, map data information, points of interest information, live recorded video and/or audio information, and any other relevant data received or processed by the electronic system.

Continuing with FIG. 4, the camera processing unit (403) is operatively connected to a camera lens on the electronic system, and is able to process image-related data from the camera lens in association with the CPU (401) and/or other logical units in the electronic system to produce live recorded video information, which may be stored in the map, GPS, and multimedia local data storage (405). Furthermore, a microphone operatively connected to the sound unit can produce live recorded audio information, which can also be stored in the map, GPS, and multimedia local data storage (405).

Moreover, the GPS and/or location tracking unit (417) may comprise a GPS signal receiver and/or another real-time location tracking chip, which enable the electronic system to detect and determine the real-time change in location and position of the electronic system or another location-tracked device. The GPS and/or location tracking unit (417) can provide GPS coordinates and other relevant data to a map navigation software loaded to the memory unit (413), wherein the map navigation software is capable of graphically showing current GPS coordinates on an electronic map. Furthermore, the current GPS coordinates and the electronic map can be referenced to clock and timestamp information and stored as part of the second data set (e.g. 307 of FIG. 3), and subsequently converted to the third data set (e.g. 315 of FIG. 3) during data set transformation procedures as illustrated and described in association with FIG. 3.

Furthermore, as shown in FIG. 4, the digital signal processing (DSP) unit for cloud server access (415) is operatively connected to an radio frequency (RF) antenna. The DSP unit for cloud server access (415) is generally configured to receive and transmit radio data and/or voice signals wirelessly for a mobile communication device, a visual monitoring system, an electronic goggle, or another suitable electronic system.

In addition, the power management unit (409) is operatively connected to a power supply unit and a power source (e.g. battery, power adapter) (421), and the power management unit (409) generally controls power supplied to an electronic system and its logical units. Moreover, the peripheral device and/or external communication I/O interface (411) as shown in FIG. 4 can be operatively connected to one or more peripheral devices, wireless devices, USB ports, and other external data communication media (423).

Continuing with FIG. 4, in the preferred embodiment of the invention, the graphics unit (407) in the system block diagram (400) for the electronic system comprises a graphics processor, a display driver, a dedicated graphics memory unit, and/or another graphics-related logical components. In general, the graphics unit (407) is able to process and communicate graphics-related data with the CPU (401), the display driver, and/or the dedicated graphics memory unit. The graphics unit (407) is also operatively connected to one or more display units (419). In addition, the CPU (401) may be operatively connected to the sound unit which contains audio-related logical components for generation or recording of audio data from a microphone operatively connected to the electronic system.

Figure 5:
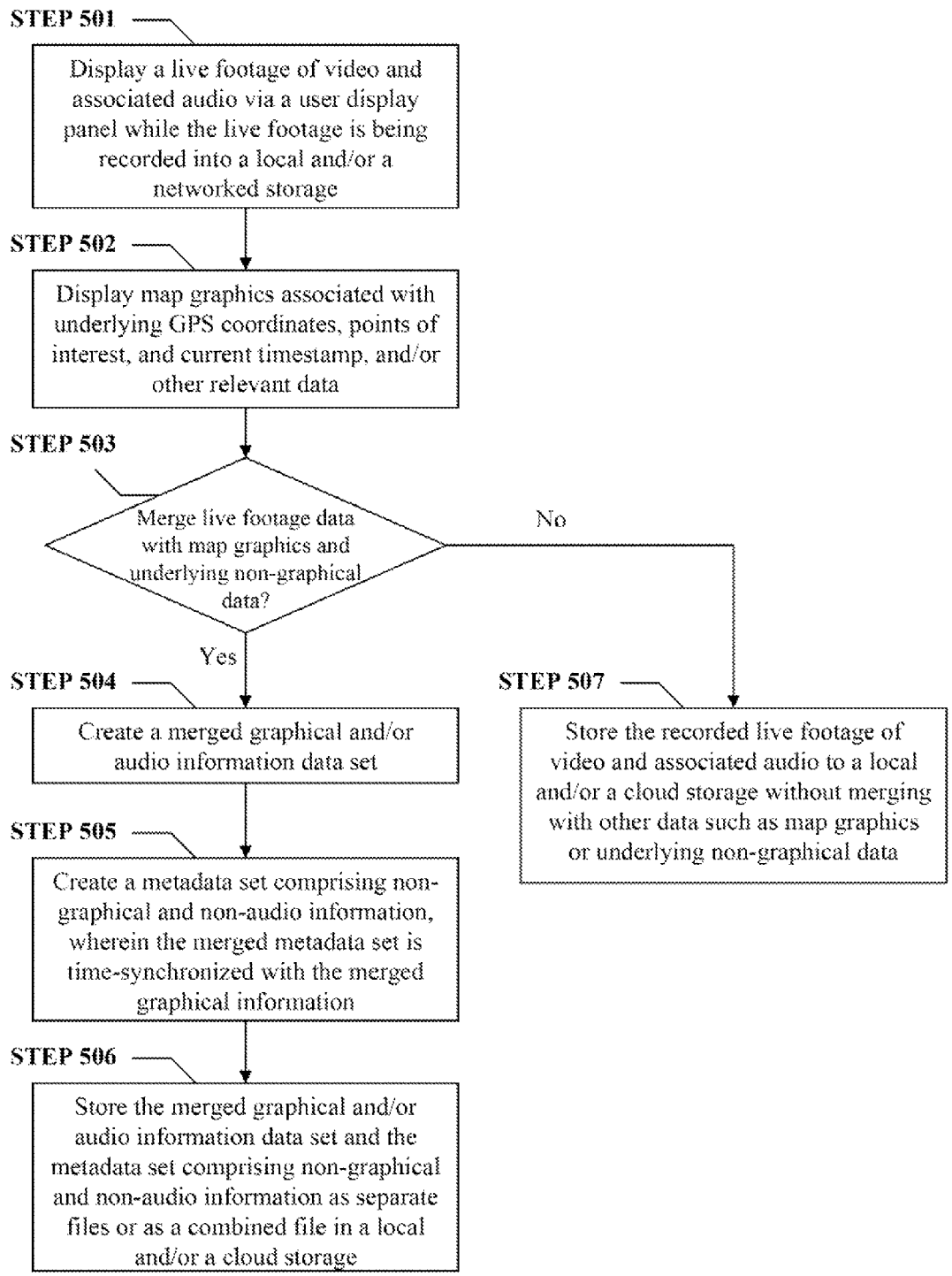
FIG. 5 shows a method of synchronizing, merging, and processing multiple data sets for an augmented reality application, in accordance with an embodiment of the invention.

FIG. 5 shows a first flowchart (500) that illustrates a method of synchronizing, merging, and processing multiple data sets for an augmented reality application, in accordance with an embodiment of the invention. In one embodiment of the invention, this method first displays a live footage of video and associated audio via a user display panel by executing a software application on a CPU and a memory unit of an electronic system, while the live footage is being recorded into a local and/or a network-attached storage on a cloud network (i.e. alternatively called a "cloud storage"), as shown in STEP 501. The method is also configured to display map graphics associated with underlying GPS coordinates, points of interests, current timestamps, and/or other relevant data, as shown in STEP 502.

Then, if the software application is instructed or set to merge the live footage of video and associated video with the map graphics and the underlying non-graphical data (e.g. GPS coordinates, points of interests, current timestamps, and/or other relevant data), as shown in STEP 503, the software application executed on the electronic system can create a merged graphical and/or audio information data set comprising the live video footage and the map graphics, as shown in STEP 504. Furthermore, the software application executed on the electronic system can also create a metadata set for non-graphical and non-audio information which includes the underlying non-graphical and non-audio data, as shown in STEP 505. Preferably, the metadata set is time-synchronized with the merged graphical and/or audio information data set by referencing to the same timestamps. Once the creation of the merged graphical and/or audio information data set and the metadata set for non-graphical and non-audio information is completed, then the software application executed on the electronic system can store the merged graphical and/or audio information data set and the metadata set for non-graphical an non-audio information as separate files or as a combined file in a local storage and/or a network-attached storage in a cloud network, as shown in STEP 506.

On the other hand, if the software application is instructed or set to avoid merging the live footage of video and associated video with the map graphics and the underlying non-graphical data (e.g. GPS coordinates, points of interests, current timestamps, and/or other relevant data), as also shown in STEP 503, the software application executed on the electronic system can simply store the recorded live footage of video and associated audio to a local storage and/or a network-attached storage in a cloud network without merging with other data such as the map graphics and the underlying non-graphical data, as shown in STEP 507.

Figure 6:
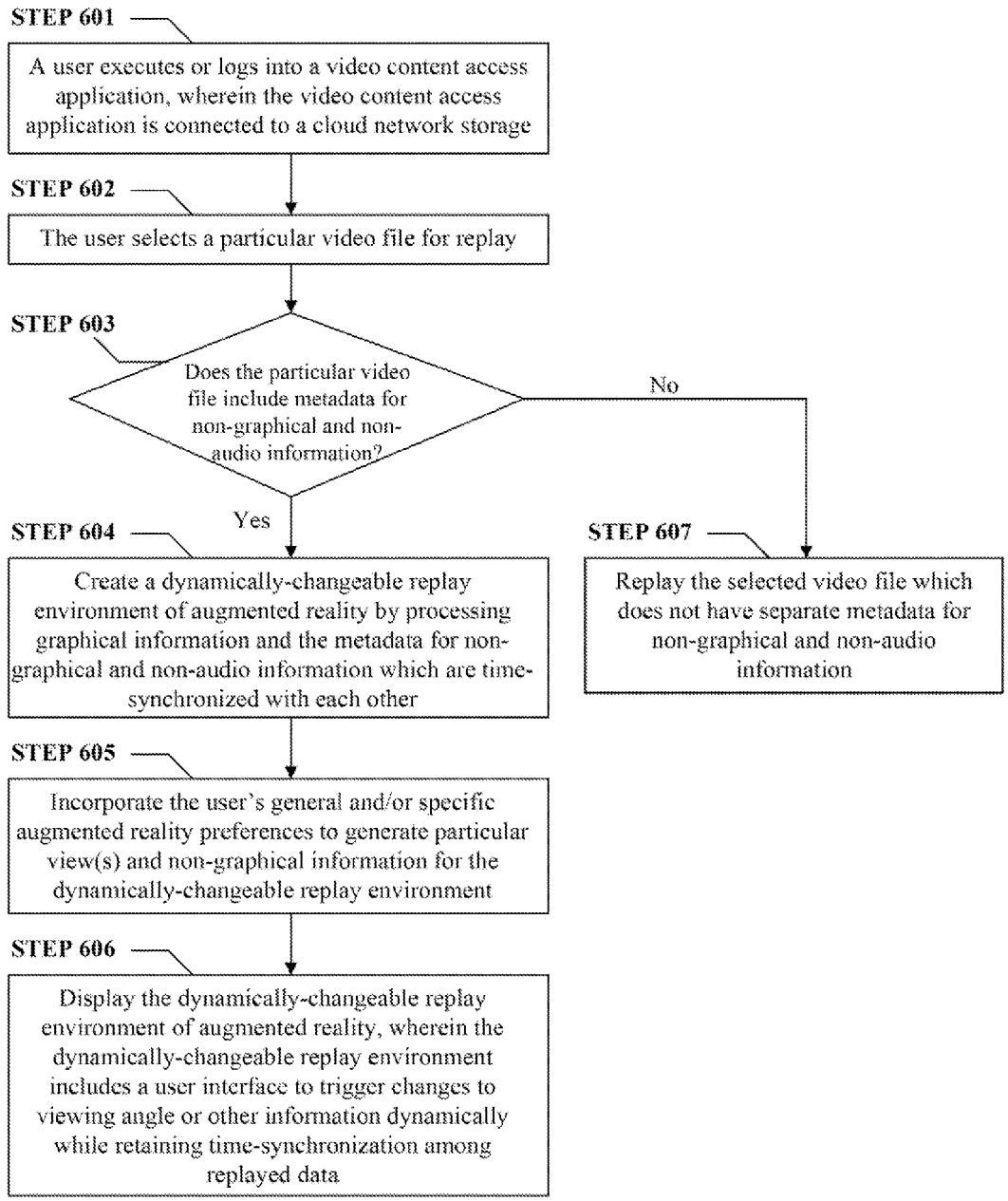
FIG. 6 shows a method of providing a dynamically-changeable replay environment of augmented reality, in accordance with an embodiment of the invention.

FIG. 6 shows a second flowchart (600) that illustrates a method of providing a dynamically-changeable replay environment of augmented reality, in accordance with an embodiment of the invention. In one embodiment of the invention, a user first executes or logs into a video content access application, an augmented reality application, or another suitable application, service, and/or website, as shown in STEP 601. Preferably, one or more of these applications are operatively connected to a cloud network storage for multimedia data retrieval. Then, the user selects a particular video file for replay using a user interface associated with the one or more of these applications, as shown in STEP 602. If the particular video file selected by the user includes metadata for non-graphical and non-audio information, as shown in STEP 603, then the video content access application, the augmented reality application, or another suitable application can create a dynamically-changeable replay environment of augmented reality by processing graphical information and the metadata for non-graphical and non-audio information which are time-synchronized with each other, as shown in STEP 604.

Subsequently, the video content access application, the augmented reality application, or another suitable application can also incorporate the user's general and/or specific augmented reality preferences to generate particular views and non-graphical information for the dynamically-changeable replay environment, as shown in STEP 605. For example, if the user preferences are focused on sensory inputs in the metadata, such as accelerometer, compass, and GPS sensor readings, the video content access application, the augmented reality application, or another suitable application can provide a user interface that incorporates an embedded calculator for interpretation of sensor readings, a time-slice analyzer for sensor readings, or another tool for the dynamically-changeable replay environment. In another example, if the user preferences are focused on comparing a front windshield view with a GPS map information on a navigational view, then the video content access application, the augmented reality application, or another suitable application can provide a user interface that juxtaposes the front windshield view with the GPS map information in a same time scale using some referenced timestamp and clock information in the metadata for non-graphical and non-audio information.

Continuing with FIG. 6, the video content access application, the augmented reality application, or another suitable application then displays the dynamically-changeable replay environment of augmented reality, as shown in STEP 606. Preferably, the dynamically-changeable replay environment includes a user interface to trigger changes to viewing angle or other information dynamically while retaining time-synchronization among replayed data.

On the other hand, if the video content access application, the augmented reality application, or another suitable application determines that the particular video file selected by the user does not include any metadata for non-graphical and non-audio information, then the selected video file can be simply replayed without interpreting any metadata for non-graphical and non-audio information, as shown in STEP 607.

Figure 7:
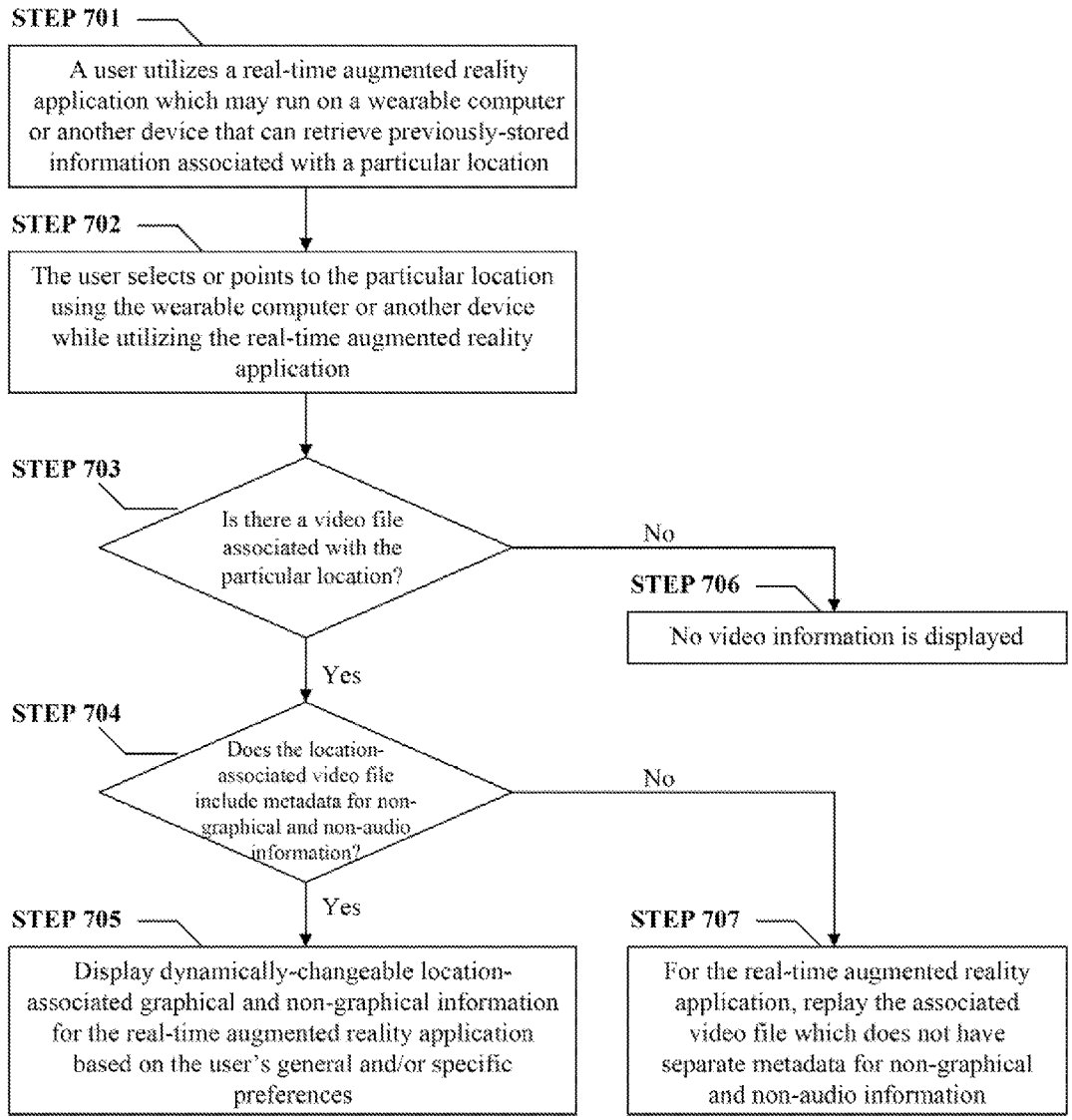
FIG. 7 shows a method of providing a geographic location search-based augmented reality, in accordance with an embodiment of the invention.

FIG. 7 shows a third flowchart (700) that illustrates a method of providing a geographic location search-based augmented reality, in accordance with an embodiment of the invention. In one embodiment of the invention, a geographic location-search based augmented reality application is executed on a CPU and a memory unit of an electronic system, which may be a visual monitoring system, a camcorder, a smart phone, an electronic goggle with an embedded display and an eye-movement tracking sensor for location-pointing, or another suitable device.

As shown in STEP 701, the geographic location-search based augmented reality application or another real-time augmented reality application is first loaded on the CPU and the memory unit of the electronic system, which is configured to retrieve previously-stored information associated with a particular geographic location. The data retrieval of the previously-stored information may occur by accessing a cloud storage (e.g. a computer server, a dedicated network-attached storage, and etc.) on a cloud computing network or by accessing a local storage. Then, the user selects or points to the particular geographic location using the electronic system, as shown in STEP 702.

Subsequently, the geographic location-search based augmented reality application or another real-time augmented reality application can check and determine whether a video file is associated with the particular geographic location in a cloud network storage or a local storage operatively connected to the electronic system, as shown in STEP 703. If the video file is found, then the geographic location-search based augmented reality application or another real-time augmented reality application can also check whether the video file includes metadata for non-graphical and non-audio information, as shown in STEP 704. If the metadata for non-graphical and non-audio information is included in the video file, the geographic location-search based augmented reality application or another real-time augmented reality application can extract the metadata and incorporate a user's general and/or specific information display preferences, and display dynamically-changeable geographic location-associated graphical information as well as non-graphical and non-audio information, as shown in STEP 705.

On the other hand, if the video file associated with the particular location is not found, as also shown in STEP 703, then no video information is displayed in the geographic location-search based augmented reality application or another real-time augmented reality application, as shown in STEP 706. If the video file associated with the particular location is found, but if the metadata for non-graphical and non-audio information is not included in the video file, then, the geographic location-search based augmented reality application or another real-time augmented reality application can simply replay the video file which does not have separate metadata for non-graphical and non-audio information, as shown in STEP 707.

Various embodiments of the present invention provides several advantages over conventional data processing and utilization for augmented reality applications. In conventional augmented reality applications, various visual, auditory, and sensory information are typically saved as separate files without intelligent merger or synthesis of multiple data sets during a data-recording procedure. A conventional augmented reality application utilizing conventional data structures for replay or for a geographic location-search augmented reality environment is unable to dynamically change or select any non-graphical and non-audio information, because it is merely embedded as "screen-captured" display information within the flattened file.

In contrast, various embodiments of the present invention uniquely enable retention of alphanumeric variables and their values for map data, GPS, sensory, and other non-graphical and non-audio information as metadata that can be processed as live variables and values in an augmented reality application, thereby providing a novel advantage of selective and dynamic information presentation in an augmented reality environment that replays or utilizes previously-recorded visual, audio, and/or sensory information.

Furthermore, by providing an electronic system and a method that synchronize and merge one or more live recorded video and/or audio information and other information (e.g. GPS information, map data information, and points of interest information) as a coherent and structured data set that comprises merged graphical and/or audio information and non-graphical and non-audio information metadata, various embodiments of the present invention improve data reception reliability and data processing efficiency for real-time augmented reality application that utilizes a cloud computing network.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An electronic system for synchronizing and merging multiple data sets for an augmented reality application, the electronic system comprising:

a CPU and a memory unit configured to execute the augmented reality application, wherein the augmented reality application provides a user interface on a display screen for display of video and other information associated with a real-world environment;

a first data set comprising previously-recorded video and/or audio information in a replay reality environment referenced to clock and timestamp information, wherein the first data set is loaded to the memory unit of the electronic system;

a second data set comprising GPS information, map data information, and points of interest information, wherein the second data set is also loaded to the memory unit of the electronic system;

a third data set created from the augmented reality application by synthesizing a graphical and audio metadata set that gathers graphical and/or audio information portion from the first data set and the second data set, and a non-graphical and non-audio metadata set that gathers non-graphical and non-audio information portion from the first data set and the second data set, wherein the third data set is a single savable file, with the graphical and audio metadata set and the non-graphical and non-audio metadata set both retroactively time-referenced to the clock and timestamp information of the first data set for correct time synchronization during replay of the third data set as the single savable file; and an external communication input and output interface configured to transmit the third data set as one or more data packets to another electronic system via a data network.

2. The electronic system of claim 1, wherein the non-graphical and non-audio metadata set includes the clock and timestamp information, camera viewing angle information, GPS coordinates, accelerometer values, compass coordinates, and/or other non-graphical and non-audio information from the first data set and the second data set.

3. The electronic system of claim 1, wherein the graphical and audio metadata set in the third data set includes the previously-recorded video information and a graphical portion of the map data information from the first data set and the second data set.

4. The electronic system of claim 1, wherein another electronic system connected via the data network operates a social media website, a video content access website, a geographic location search-based augmented reality application, or a multimedia analytics program.

5. The electronic system of claim 1, further comprising a local data storage integrated in the electronic system, wherein the local data storage is configured to save a local copy of at least one of the first data set, the second data set, and the third data set.

6. The electronic system of claim 1, further comprising a GPS and location tracking unit capable of receiving GPS signals via a GPS antenna and generating the GPS information relative to a current location of the electronic system.

7. The electronic system of claim 1, further comprising a camera processing unit operatively connected to a camera lens, wherein the camera processing unit is capable of recording the video information from the real-world environment through the camera lens, and wherein the camera processing unit is also at least partly capable of converting the video information to the previously-recorded video information of the first data set in association with the CPU.

8. The electronic system of claim 1, further comprising a power management unit operatively connected to a battery, a power adapter, or another power source.

9. The electronic system of claim 1, further comprising a graphics unit capable of controlling and driving a display driver to display the user interface on the display screen.

10. The electronic system of claim 1, further comprising a digital signal processing unit for a cloud network access via a wireless data network.

11. The electronic system of claim 1, wherein the external communication input and output interface includes a network interface card for a data network connection.

12. A method for synchronizing, merging, and utilizing multiple data sets for an augmented reality application executed on a CPU and a memory unit of an electronic system, the method comprising:
   displaying a previously-recorded video footage in a replay reality environment via a user display panel;
   displaying map graphics and underlying non-graphical and non-audio data including GPS coordinates, points of interest, and/or current timestamps; and
   when the augmented reality application is configured to merge the previously-recorded video footage with the map graphics and the underlying non-graphical and non-audio data as a single savable file:
      creating a merged graphical and/or audio information data set comprising the previously-recorded video footage and the map graphics;
      creating a metadata set for non-graphical and non-audio information which includes the underlying non-graphical and non-audio data, wherein the metadata set is time-synchronized with the merged graphical and/or audio information data set by retroactively referencing to same timestamps; and
      storing the merged graphical and/or audio information data set and the metadata set for non-graphical and non-audio information as the single savable file in a local and/or a cloud network storage.

13. The method of claim 12, further comprising a step of executing or logging into a video content access application on the electronic system or on another electronic system operatively connected to the cloud network storage.

14. The method of claim 13, further comprising a step of selecting separate files or a combined file for replay.

15. The method of claim 14, further comprising a step of creating a dynamically-changeable replay environment of augmented reality by processing the merged graphical and/or audio information data set and the metadata set for non-graphical and non-audio information from the separate files or from the combined file stored in the cloud network storage.

16. The method of claim 15, further comprising a step of incorporating a user's general or specific augmented reality preferences to generate one or more graphical views and non-graphical and non-audio information for the dynamically-changeable replay environment.

17. The method of claim 16, further comprising a step of displaying the dynamically-changeable replay environment of augmented reality, wherein the dynamically-changeable replay environment includes a user interface to trigger a dynamic change to the one or more graphical views and the non-graphical and non-audio information.

* * * * *